United States Patent [19]

Markert et al.

[11] Patent Number: 4,582,723

[45] Date of Patent: Apr. 15, 1986

[54] HEAT-HARDENABLE REACTION RESIN MIXTURES FOR IMPREGNATING AND EMBEDDING

[75] Inventors: Helmut Markert, Nuremberg; Wolfgang Rogler; Klaus Kretzschmar, both of Erlangen; Wolfgang Bendel, Leonberg, all of Fed. Rep. of Germany

[73] Assignee: Siemens Aktiengesellschaft, Berlin and Munich, Fed. Rep. of Germany

[21] Appl. No.: 624,980

[22] Filed: Jun. 27, 1984

[30] Foreign Application Priority Data

Jun. 27, 1983 [DE] Fed. Rep. of Germany ....... 3323153

[51] Int. Cl.$^4$ .................. B05D 5/12; C08K 3/26; C08G 18/30
[52] U.S. Cl. .................... 427/116; 524/425; 524/437; 524/839; 528/48; 528/52; 528/53; 528/73
[58] Field of Search ............ 528/48, 52, 53, 73; 427/116; 524/425, 437, 839

[56] References Cited

U.S. PATENT DOCUMENTS

| | | | |
|---|---|---|---|
| 3,694,406 | 9/1972 | D'Alelio | 528/48 |
| 3,721,650 | 3/1973 | D'Alelio | 528/48 |
| 3,737,406 | 6/1973 | D'Alelio | 528/48 |
| 3,817,938 | 6/1974 | Ashida et al. | 528/52 |
| 4,384,101 | 5/1983 | Kovacs | 528/52 |

FOREIGN PATENT DOCUMENTS 2000148  1/1979  United Kingdom ............... 528/73

*Primary Examiner*—Herbert S. Cockeram
*Attorney, Agent, or Firm*—Kenyon & Kenyon

[57] ABSTRACT

The invention relates to a heat-hardened molded material produced from a resin mixture of a polyfunctional epoxide, a polyfunctional isocyanate and a reaction accelerator, which optionally contains additives and/or fillers. The objective is to make a resin mixture which permits the manufacture of a highly heat-resistant molded material, and which has at the same time a high-temperature cycle resistance and good mechanical properties. For this purpose, the polyfunctional epoxide of the resin includes a polyoxyalkylene glycol polyglycidyl ether.

10 Claims, No Drawings

HEAT-HARDENABLE REACTION RESIN MIXTURES FOR IMPREGNATING AND EMBEDDING

BACKGROUND OF THE INVENTION

The invention relates to heat-hardenable reaction resin mixtures which contain polyfunctional epoxides, polyfunctional isocyanates and a reaction accelerator as well as optional additives and/or fillers. The invention as well relates to the use of such reaction resin mixtures.

In electrotechnology, epoxy resins and in particular, acid-anhydride-hardenable epoxy resins are important because, being reaction resins which are employed without solvents, they can be used for many applications, especially for insulating purposes. The epoxy resin molded materials made from the epoxy resins exhibit very good thermal-mechanical properties. The temperature range in which they must be operative, however, includes both very high and very low temperatures. This requires epoxy resin molded materials with improved temperature cycle resistance and at the same time, high dimensional heat stability.

It is known that the temperature cycle resistance of acid-anhydride-hardened epoxy resin molded materials can be improved by the addition of flexibilizers (see, for instance, Henry Lee and Kris Neville, "Handbook of Epoxy Resins", McGraw-Hill Book Company, 1967, pages 16-1 ff). Frequently used flexibilizers are, for instance, polyoxyalkylene glycols as well as polyoxyalkylene glycol polyglycidyl ethers which are incorporated by hydroxy or epoxy functions into the polymer network. The improvement of the temperature cycle resistance by flexibilizing with polyoxyalkylene glycol polyglycidyl ethers, however, causes a drop in the required high dimensional heat stability. Since, in addition, acid-anhydride hardenable epoxy resins are not very suitable for the design of insulating materials with a fatigue strength of more than 155° C., new reaction resins with high dimensional heat and hot-fatigue stability and at the same time good mechanical properties and good temperature cycle resistance must be developed. Polyimide resins and polyamide imide resins as well as bismaleimide resins would in principle be suitable therefor. These resins are eliminated, however, as they are difficult to prepare as low-viscosity resins without solvents. Silicones are not suited because they have insufficient mechanical properties, especially at high temperature, and have insufficient adhesion to metal surfaces.

Molded materials which are built up from isocyanurate heterocycle structures (hereinafter ICR), have been found to be particularly heat resistant. These heat-resistant heterocycles as well as heat-resistant oxazolidinone structures (OX) are generated in the hardening of reaction resin mixtures of polyepoxides and polyisocyanates (hereinafter EP/IC resins). The molded materials (e.g., OX/ICR molded materials), which can be produced from the EP/IC resins and which contain OX and ICR rings, exhibit high dimensional heat stability or resistance. The dimensional heat resistance of these molded materials increases with increasing content of isocyanurate rings. At the same time, however, also the brittleness of the resetting molded materials increases, i.e., the mechanical properties and the temperature cycle resistance become worse. If EP/IC resins are used for the manufacture of highly heat-resistant insulating materials, the temperature cycle resistance and the crack resistance, respectively, of the OX/ICR molded materials are found to be too low. When they are used as coating resins for metallic conductors, the tendency of the OX/ICR molded materials to develop cracks is additionally increased by the large difference of the linear thermal coefficient of expansion between the metal and the resin. If it is possible on account of the boundary conditions, this difference can be reduced by adding mineral fillers, but the usable filler content is limited by the increasing viscosity of the resin mixture as well as by the degradation of the mechanical properties. Therefore, there is a demand for highly heat-resistant polymer molded materials which have at the same time an excellent continuous temperature cycle resistance and good mechanical properties.

Therefore, it is an object of the invention to develop heat-hardenable reaction resin mixtures based upon polyfunctional epoxides and polyfunctional isocyanates which permit the manufacture of highly heat-resistant molded materials and which have at the same time high temperature-cycle resistance and good mechanical properties.

SUMMARY OF THE INVENTION

According to the invention, these and other objects are achieved by a molded material formed from polyepoxide and polyisocyanate reaction resin mixture which includes a polyoxyalkylene-glycol-polyglycidyl ether in addition to other polyfunctional epoxides. It has surprisingly been found that such a molded material can be manufactured with properties desired for electrotechnology, by reacting an EP/IC resin mixture of a polyepoxide and a polyisocyanate which contains in addition to other polyfunctional epoxides, a polyoxyalkylene glycol polyglycidyl ether. In the crosslinking reaction process, a superior OX/ICR molded material is then produced.

DETAILED DESCRIPTION OF THE INVENTION

The excellent mechanical properties of the OX/ICR molded materials made from the reaction resin mixtures according to the invention which have at the same time a high dimensional heat resistance, can be understood by the development of a two-phase system. REM pictures show an OX/ICR matrix with an elastifying polyoxyalkylene-glycol phase which is distributed finely dispersed therein. This result is surprising because it is known that in acid-anhydride-hardenable epoxy resins, as already explained, polyoxyalkylene glycols or polyoxyalkylene glycol polyglycidyl ethers act as normal flexibilizers which improve the temperature-cycle resistance, but at the expense of a greatly reduced dimensional heat resistance. The elastifying effect determined in EP/IC resins, while preserving a high dimensional heat resistance, due to the development of a two-phase system, as is the case particularly for polyoxybutylene-glycolbisglycidyl ether, could therefore not be predicted. When using polyoxypropylene-glycolbisglycidyl ether, REM pictures show that a less-pronounced two-phase system is formed. Nevertheless, the corresponding OX/ICR molded materials exhibit likewise a high dimensional heat resistance while retaining very good mechanical properties.

From U.S. Pat. No. 4,100,118 and U.S. Pat. Nos. 4,128,531 and 4,130,546, OX/ICR molded materials with improved temperature cycle resistance and cracking resistance are known which are obtained by modification through elastification agents known from acid-anhydride-hardened epoxy molding materials.

These elastification agents, namely, polyglycidyl esters of fatty acids or alpha, omega functional copolymers of butadiene and acrylnitrile, however, are not compatible with EP/IC resins and create problems in the processing of the resins. The polyoxyalkylene glycolpolyglycidyl ethers contained in the reaction resin mixtures according to the invention can be mixed, in contrast thereto, with the EP/IC resins, whereby the processing of these systems becomes substantially more simple.

OX/ICR molded materials which were prepared by thermal cross-linking from EP/IC resins modified by polyoxyalkylene glycolpolyglycidyl ethers are suitable for many applications in electrotechnology due to the high dimensional heat resistance and temperature cycle resistance as well as to the good mechanical and electrical properties. Thus, electrical windings for rotating machines and transformers can be impregnated or cast-in, for instance, with these EP/IC resins, and can be cross-linked for use as insulation meeting the criteria of insulation classes F and H and having excellent temperature cycle resistance. The reaction resin mixtures according to the invention are also suitable for the manufacture of mechanically strong insulating parts such as insulators, holding and support elements as well as for bushings in switching and power transmission technology. A further preferred field of application is the embedment and encapsulation of thermally highly stressed electronic components, for instance, in automotive engineering.

The polyoxyalkylene glycol polyglycidyl ethers contained in the reaction resin mixtures according to the invention are commercially available. They can also be prepared by known methods, for instance by glycidylizing polyoxyalkylene polyols with epichlorohydrin. The polyoxyalkylene polyols required for this purpose are likewise commercially available; they are frequently used for forming soft segments in polyurethanes. The polyoxyalkylene polyols can also be prepared, however, by homo- or copolymerization of cyclical ethers such as ethylene oxide, propylene oxide, styrene oxide and tetrahydrofuran. Also, by addition of alkylene oxides to differing glycols, polyoxyalkylene glycols can be prepared, while by addition of alkylene oxides to higher-functional polyols, higher-functional polyoxyalkylene polyols are produced. All the foregoing polyols can then by glycidylized, for instance, with epichlorohydrin.

Examples of the polyoxyalkylene glycol polyglycidyl ethers which can be substituted in the reaction resin mixtures according to the invention are: polyoxyethylene glycol bisglycidyl ether, polyoxypropylene glycol bisglycidyl ether, copolyoxyethylene oxypropylene glycol bisglycidyl ether, polyoxybutylene glycol bisglycidyl ether, the diglycidyl ether of the glycol obtained by addition of propylene oxide to neopentyl glycol, and the triglycidyl ether of the triol obtained by addition of the propylene oxide to trimethylol propane. A particularly suitable epoxy component is the polyoxybutylene glycol bisglycidyl ether.

In the EP/IC resin mixtures according to the invention, polyoxyalkylene glycol polyglycidyl ethers with an average mole mass of 400 to 2000 and preferably 600 to 1200 are generally used.

If the avrage mole mass is more than 2000, then the viscosity of the epoxy resin mixture increases steeply and negatively influences the workability, particularly of filler-containing reaction resins. If the average mol mass is below 400, then the range of reactive thinners is approached which act as internal plasticizers and drastically degrade the dimensional heat resistance.

For achieving good molded material properties, especially high dimensional heat resistance and high continuous heat resistance, the content of the polyoxyalkylene glycol polyglycidyl ether in the epoxy resin mixture is 10 to 60% by weight and preferably 20 to 50% by weight.

The formula mol ratio of the epoxy and isocyanate groups (EP:IC) in the reaction resin mixtures according to the invention is preferably less than 1; however, a formula mol ratio greater than 1 can also be used.

Particularly well suited as polyepoxides are relatively low-viscosity aliphatic, cycloaliphatic, or aromatic epoxides as well as their mixtures. Preferably usable are bisphenol-A-diglycidyl ether, bisphenol-F-diglycidyl ether, 3,4-epoxy cyclohexylmethyl-3',4'-epoxy cyclohexane carboxylate and polyglycidyl ether of phenol/-formaldehyde- or cresol/formaldehyde-novolak as well as diglycidyl esters of phthalic, isophthalic or terephthalic acid. Other usable polyepoxides are, for instance, hydrogenated bisphenol-A- or bisphenol-F-diglycidyl ethers, hydantoin epoxy resins, triglycidylisocyanurate, triglycidyl-p-aminophenol, tetraglycidyldiaminodiphenyl methane, tetraglycidyldiamino diphenyl ether and tetrakis(4-glycidoxyphenyl)-ethane as well as epoxides which are described in "Handbook of Epoxy Resins" by Henry Lee and Kris Neville, McGraw-Hill Book Company, 1967, and in the monograph by Henry Lee "Epoxy Resins", American Chemical Society, 1970.

Relatively low-viscosity aliphatic, cycloaliphatic or aromatic isocyanates as well as their mixtures are particularly well suited as polyisocyanates. Preferably can be used isomeric mixtures of 4,4'- and 2,4-diphenyl methane diisocyanate, polyol-modified polyisocyanates and mixtures of liquid polyisocyanates with higher-molecular polyisocyanates or carbodiimide-polyisocyanates. Further usable polyisocyanates are, for instance, hexane-1,6-diisocyanate, cyclohexane-1,3-diisocyanate and isomers thereof, 4,4'-dicyclohexyl methane diisocyanate, 3-isocyanatomethyl-3,5,5-trimethyl-cyclohexylisocyanate, 1,3-dimethylbenzene omega, omega'-diisocyanate and isomers, 1-methylbenzene-2,4-diisocyanate and isomers, naphthaline-1,4-diisocyanate, diphenyl ether-4,4'-diisocyanate and isomers, diphenylsulfone-4,4'-diisocyanate and isomers as well as tri- or higher-functional isocyanates such as 3,3',4,4'-diphenyl methanetetraisocyanate. Furthermore, also isocyanates can be used which are masked in the usual manner with phenol or cresol. Dimers and trimers of the mentioned multivalent isocyanates can likewise be used. Such isocyanates have free end-position isocyanate groups and contain one or more uretdione and/or isocyanurate rings. Methods for manufacturing different kinds of such trimers and uretdiones are described, for instance, in U.S. Pat. Nos. 3,494,888; 3,108,100 and 2,977,370.

The EP/IC resins may also contain components which in general do not participate in the chemical reactions which lead to OX/ICR molded materials. Suitable as such fillers are mineral and fibrous fillers such as quartz powder, vitreous fused quartz, aluminum oxide, glass powder, mica, kaolin, dolomite, graphite and carbon black as well as carbon fibers, glass fibers and textile fibers. Pigments, stabilizers, adhesion agents as well as other additives of the usual kind can likewise be added to the EP/IC resins.

For the EP/IC resins according to the invention, the reaction accelerators or (hardening) catalysts which promote the formation of OX and ICR rings, play an important role. Suitable as such catalysts are amines and preferably, tertiary amines and imidazoles. Examples for tertiary amines are tetramethylethylene diamine, dimethyloctylamine, dimethylaminoethanol, dimethylbenzylamine, 2,4,6-tris(dimethylaminomethyl)-phenol, N,N'-tetramethyldiaminodiphenyl-methane, N,N'-dimethylpiperazine, N-methylmorpholine, N-methylpiperidine, N-ethylpyrrolidine, 1,4-diazabicyclo(2,2,2)octane and quinoline. Suitable imidazoles are, for imstance, 1-methylimidazole, 2-methylimidazole, 1,2-dimethylimidazole, 1,2,4,5-tetramethylimidazole, 1-benzyl-2-phenylimidazole, 2-undecylimidazole, 2-heptadecylimidazole, 2-ethyl-4-methylimidazole, 1-cyanoethyl-2-ethyl-4-methylimidazole, 1-cyanoethyl-2-phenylimidazole and 1-(4,6-diamino-s-triazinyl-2-ethyl)-2-phenylimidazole.

As hardening catalysts for the EP/IC resins are further suitable onium salts and preferably, onium salts with N or P as the central atom. Examples for usable onium salts are: tetraethylammonium chloride, tetraethylammonium bromide, octyltrimethylammonium bromide, benzyltrimethylammonium chloride, tetrabutylphosphonium bromide, N-ethylmorpholinium bromide, 2-ethyl-4-methylimidazolium bromide, N-ethylmorpholinium tetraphenyl borate, 1,2-dimethylimidazoliumtetraphenyl borate and tetrabutylammonium tetraphenyl borate.

The mentioned catalysts lead to mechanically-thermally high-quality OX/ICR molded materials in the thermal hardening of the EP/IC resins according to the invention, which preferably takes place at temperatures of up to 220° C. However, they catalyze the hardening reaction at low temperatures and thus lead to a relatively short service life, which can make the processing of the reaction resins more difficult. Therefore, latent hardening catalysts are preferably used in the EP/IC resin mixtures according to the invention, which assure a sufficient service life at low temperatures. Suitable as such catalysts, which are also called latent reaction accelerators, are in particular addition complexes of boron trihalogenides with tertiary amines and imidazoles, for instance, the addition complexes described in U.S. Pat. No. 4,131,600, of borontrichloride and tertiary amines with the general formula $BCl_3.NR^1R^2R^3$, where $R^1$, $R^2$ and $R^3$ are the same or different aliphatic, aromatic heterocyclic or arylaliphatic radicals which can also be parts of heterocyclic rings. Suitable are also the analogous complexes of boron trifluoride with the formula $BF_3.NR^1R^2R^3$, where $R^1$, $R^2$ and $R^3$ have the meaning given above. Specific examples for suitable tertiary amines of the BF$_3$ and BCl$_3$ complexes are octyldimethylamine and dimethylbenzylamine. Also morpholine compounds and imidazols, especially N-methylmorpholine, N-ethylmorpholine, 1,2-dimethylimidazole and 1-benzyl-2-phenylimidazole are suitable for the formation of BCl$_3$ and BF$_3$ complexes.

An extension of the service life of the EP/IC resins according to the invention can be achieved also if tertiary amines or imidazoles are used as the latent catalysts which are deactivated by the addition of electron acceptors. Suitable electron acceptors are, for instance: 7,7,8,8-tetracyanoquinodimethane, 2,3-dichloro-5,6-dicyanobenzoquinone and 2,3,5,6-tetrachlorobenzoquinone.

The content of hardening catalyst in the EP/IC resins is advantageously 0.01 to 5% by weight and preferably 0.25 to 2.5% by weight, referred to the mass of the resin matrix. By the type and the concentration of the hardening catalyst, the hardening temperature and the hardening time can be influenced.

The invention will be explained in greater detail with the aid of embodiment examples.

EXAMPLES 1 TO 3

A novolak epoxy resin (resin A, Ep-value–0.57 mol/100 g, at 50° C. is 2200 mPasec) is mixed with a polyoxybutylene glycol bisglycidyl ether (resin B, Ep-value–0.24 mol/100 g, n at 25° C. is 190 mPa sec), an isomer mixture of diisocyanatodiphenyl methane liquid at room temperature (MDI, IC-value=0.79 mol 100 g, n at 25° C.=15 mPa sec) and 65% quartz powder (16,900 M/cm$^2$) and degassed for 1 hour at 80° C./1 mbar, while stirring. Subsequently, the mix is cooled down to 60° C., the reaction accelerator (RKB), for instance, BCl$_3$.DMBA (BCl$_3$-adduct of dimethylbenzylamine) is added and degassing takes place for another hour at 60° C./1 mbar. The composition of the reaction resin mixtures is given in Table 1. The reaction resin mixtures are poured in a vacuum into molds preheated to 100° C. and are hardened for 4 hours at 140° C. and for 16 hours at 200° C. to form molded materials. On the molded materials prepared in this manner, the impact strength (SZ) was determined according to DIN 53 453, the bending strength (BF) according to DIN 53 452 and the dimensional heat resistance after Martens (TM) according to DIN 53 458. The values obtained are summarized in Table 2.

TABLE 1

| Composition of the Reaction Resin Mixtures (MT = mass parts) | | | | | |
|---|---|---|---|---|---|
| Example | Resin A (MT) | Resin B (MT) | MDI (MT) | RKB (MT) | Filler (MT) |
| 1 | 100 | 100 | 250 | 6.75 of BCl$_3$.DMBA | 836 |
| 2 | 100 | 100 | 250 | 4.5 of Cyanoethyl 2-phenyl imidazol | 836 |
| 3 | 50 | 100 | 164 | 4.85 BCl$_3$.DMBA | 602 |

TABLE 2

| Thermal-Mechanical Properties of the OX/ICR Molded Materials | | | |
|---|---|---|---|
| Example | SZ Nmm/mm2 | BF N/mm2 | TM °C. |
| 1 | 14 + 3 | 132 + 8 | 215 |
| 2 | 11 + 2 | 108 + 15 | 213 |
| 3 | 10 + 1 | 80 + 3 | 172 |

EXAMPLES 4 AND 5

A novolak epoxy resin (resin C, Ep-value=0.56 mol/100 g, n at 70° C. is 5000 mPa sec) is processed together with a polyoxypropylene glycol bisglycidyl ether (Resin D, Ep-value=0.53 mol/100 g, at 25° C. is 80 mPa sec), an isomer mixture, liquid at room temperature of diisocyanatodiphenyl methane (MDI) and 65% quartz powder analogously to Examples 1 to 3 and processed in the presence of a reaction accelerator (RKB) to form molded materials. The composition of the reaction resin mixtures may be seen from Table 3. As described in connection with Examples 1 to 3, the thermal-mechanical properties were measured on the hardened molded materials; they are summarized in Table 4.

TABLE 3

Composition of the Reaction Resin Mixtures (MT = Mass parts)

| Example | Resin C MT | Resin D (MT) | MDI (MT) | RKB (MT) | Filler (MT) |
|---|---|---|---|---|---|
| 4 | 100 | 100 | 372 | 8.6 of BCl$_3$.DMBA | 1060 |
| 5 | 100 | 100 | 372 | 5.7 Cyanoethyl-2-phenylimidazol | 1060 |

TABLE 4

Thermal-Mechanical Properties of the OX/ICR Molded Materials

| Example | SZ Nmm/.m2 | BF N/mm2 | TM |
|---|---|---|---|
| 4 | 12 + 1 | 114 + 1 | 225 |
| 5 | 14 + 1 | 143 + 12 | 228 |

EXAMPLES 6 TO 8

A bisphenol-F-bisglycidyl ether (resin E, Ep-value=0.62 mol/100 g; n at 50° C. is 1100 mPa sec) is prepared together with a polyoxybutylene glycol bisglycidyl ether (resin B) and an isomer mixture, liquid at room temperature, of diisocyanatodiphenyl methane (MDI) as well as 65% quartz powder analogously to Examples 1 to 3 and processed in the presence of a reaction accelerator (RKB) to form molded materials. The composition of the reaction resin mixtures is given in Table 5. As described in Examples 1 to 3, the thermal mechanical properties are measured on the hardened molded materials; they are summarized in Table 6.

TABLE 5

Composition of the Reaction Resin Mixtures (MT-Mass parts)

| Example | Resin E (MT) | Resin B (MT) | MDI (MT) | RKB (MT) | Filler (MT) |
|---|---|---|---|---|---|
| 6 | 100 | 100 | 290 | 7.4 of BCl$_3$.DMBA | 910 |
| 7 | 100 | 100 | 290 | 4.9 of Cyanoethyl 2-phenyl imidazole | 910 |
| 8 | 100 | 50 | 248 | 6.0 BCl$_3$.DMBA | 739 |

TABLE 6

Thermal-Mechanical Properties of the OX/ICR Molded Materials

| Example | SZ Nmm/mm2 | BF N/mm2 | TM °C. |
|---|---|---|---|
| 6 | 12 + 2 | 104 + 10 | 228 |
| 7 | 13 + 1 | 120 + 4 | 215 |
| 8 | 11 + 1 | 118 + 6 | 224 |

REFERENCE EXAMPLES 9 AND 10

A bisphenol-F-bisglycidyl ether (resin E) is prepared together with an isomer mixture, liquid at room temperature, of diisocyanatodiphenyl methane (MDI) and 65% quartz powder as a filler, as described in Examples 1 to 3, and processed in the presence of a reaction accelerator (RKB) into molded materials. The composition of the reaction resin mixtures can be seen from Table 7. As described in Examples 1 to 3, the thermal-mechanical properties were measured on the hardened molded materials; they are summarized in Table 8.

TABLE 7

Composition of the Reaction Resin Mixtures (MT-Mass parts)

| Reference Example | Resin E (MT) | MDI (MT) | RKB (MT) | Filler (MT) |
|---|---|---|---|---|
| 9 | 100 | 156 | 3.8 of BCl$_3$.DMBA | 472 |
| 10 | 100 | 156 | 2.5 of Cyanoethyl-2-phenyl imidazole | 472 |

TABLE 8

Thermal-Mechanical Properties of the OX/ICR Molded Materials

| Reference Example | SZ Nmm/mm2 | BF N/mm2 | TM °C. |
|---|---|---|---|
| 9 | 9 | 108 | 209 |
| 10 | 10 | 112 | 202 |

EXAMPLE 11

Model high-voltage windings for dry-type transformers were prepared from polyimide foil (25 um thick, 56 mm wide) as layer insulation and aluminum tapes (0.1 mm thick, 50 mm wide) and model coils consisting of 4 windings were set up therefrom in a casting mold. The spaces to be cast-in with the reaction resin mixtures between the individual coils as well as between the coils and the casting-mold wall were 6 to 8 mm, and at the pouring about 15 mm. The model coils were cast-full with the resin mixture described in Example 1, and the casting resin was subsequently gelled for about 90 min at 130° to 140° C. at overpressure by means of heating the winding. The model coils were then removed from the mold and immediately annealed for 6 hours at 150° C. and for another 15 hours at 200° C. Model coils made in this manner withstand temperature cycles from +200° to −70° C. without crack formation.

REFERENCE EXAMPLE 12

Model coils were built-up as in Example 11 and cast-in with the resin mixture which was described in the reference example 9 and was prepared as described in Examples 1 to 3. The casting resin was subsequently gelled for about 90 min at 130° to 140° C. under overpressure by means of heating the windings. The model coils were then removed from the mold and immediately annealed for 6 hours at 150° C. and for another 15 hours at 200° C. During the cooling to room temperature, the model coils cracked open in several places along the outer circumference.

What is claimed is:

1. A molded material produced from a thermal hardenable reaction resin mixture comprising a polyfunctional epoxide, a polyfunctional isocyanate and a reaction accelerator; wherein from 10 to 60% by weight of the polyfunctional epoxide is a polyoxyalkylene glycol polyglycidyl ether having 2 to 4 carbons in the polyoxyalkylene group and being of an average mole mass of 400 to 2000, and the remaining weight percentage of the polyfunctional epoxide is an aliphatic, cycloaliphatic or aromatic polyepoxide, said molded material being a two-phase system of an oxazolidinone/isocyanurate matrix with an elastifying polyoxyalkylene-glycol phase finely dispersed therein, and said oxazolidinone/isocyanurate matrix and said polyoxyalkylene-glycol phase being free from any reaction accelerator covalently bonded thereto.

2. A material according to claim 1 wherein the polyoxyalkylene glycol polyglycidyl ether is obtained by glycidylizing a copolymeric polyoxyalkylene glycol.

3. A material according to claim 1 wherein the mole mass is about 600 to about 1200.

4. A material according to claim 1 wherein the percentage of said ether present is about 20% to about 50%.

5. A material according to claim 1 wherein polyoxyalkylene glycol polyglycidyl ether is polyoxybutylene glycol bisglycidyl ether.

6. A material according to claim 1 wherein the resin mixture is cross-linked and hardened by heating said mixture at a temperature from about room temperature up to 220° C.

7. A material according to claim 1 wherein the reaction accelerator is a latent reaction accelerator.

8. A material according to claim 1 further comprising a filler.

9. A material according to claim 8 wherein the filler is quartz powder, fused silica, aluminum oxide or dolomite.

10. A method for the use of the material according to claim 1 which comprises impregnating an electrical component with the reaction resin mixture and thermally reacting said impregnated mixture to form the molded material which embeds said component.

* * * * *